(12) United States Patent
Van Heukelom et al.

(10) Patent No.: US 11,215,997 B2
(45) Date of Patent: Jan. 4, 2022

(54) PROBABILISTIC RISK ASSESSMENT FOR TRAJECTORY EVALUATION

(71) Applicant: Zoox, Inc., Foster City, CA (US)

(72) Inventors: Matthew Van Heukelom, San Francisco, CA (US); Jefferson Bradfield Packer, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 502 days.

(21) Appl. No.: 16/206,877

(22) Filed: Nov. 30, 2018

(65) Prior Publication Data

US 2020/0174481 A1 Jun. 4, 2020

(51) Int. Cl.
*G05D 1/02* (2020.01)
*G05D 1/00* (2006.01)

(52) U.S. Cl.
CPC ......... *G05D 1/0214* (2013.01); *G05D 1/0088* (2013.01); *G05D 2201/0213* (2013.01)

(58) Field of Classification Search
CPC ............... G05D 1/0214; G05D 1/0088; G05D 2201/0213; B60W 60/0011; B60W 30/0956; B60W 60/0015; B60W 2554/4041; G06N 3/084; G06N 3/088; G06N 5/003; G06N 3/0454; G06N 20/10; G06N 3/0472; G06N 20/20; G06N 3/0445; G06N 7/005; G01C 21/3407
USPC .......................................................... 701/23
See application file for complete search history.

(56) References Cited

U.S. PATENT DOCUMENTS

| | | | |
|---|---|---|---|
| 2010/0010699 A1* | 1/2010 | Taguchi | G08G 1/167 701/23 |
| 2019/0333386 A1* | 10/2019 | Horita | B60W 30/0956 |
| 2019/0337511 A1* | 11/2019 | Nguyen | B60W 40/04 |

FOREIGN PATENT DOCUMENTS

| EP | 2084690 A2 | 8/2009 |
|---|---|---|
| JP | WO2017217265 A1 | 12/2017 |

OTHER PUBLICATIONS

The PCT Search Report and Written Opinion dated Mar. 13, 2020 for PCT Application No. PCT/US2019/063037, 13 pages.

* cited by examiner

*Primary Examiner* — Nadeem Odeh
(74) *Attorney, Agent, or Firm* — Lee & Hayes, P.C.

(57) ABSTRACT

Techniques are discussed for evaluating trajectories based on risk associated with the trajectories with respect to predicted locations of objects in an environment. A vehicle can capture sensor data of an environment, which may include object(s) separate from the vehicle, such as another vehicle or a pedestrian. A prediction system can output a discretized probability distribution comprising prediction probabilities associated with possible locations of the object in the future. Heat maps, as an example discretized probability distribution, can represent one or more objects. Trajectories can be generated for the vehicle to follow in the environment. An overlap between a region of the vehicle along a trajectory and the heat map can be determined, and a probability associated with the overlap can represent a risk associated with a trajectory navigating through the environment. The vehicle can be controlled based on risks associated with the various trajectories.

20 Claims, 8 Drawing Sheets

PROBABILISTIC RISK ASSESSMENT FOR TRAJECTORY EVALUATION

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, generating routes for an autonomous vehicle can be computationally intensive or can provide low accuracy results in order to ensure a route can be generated within a period of time. Further, the presence of other entities in an environment can introduce complexities in evaluating risk associated with various trajectories.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
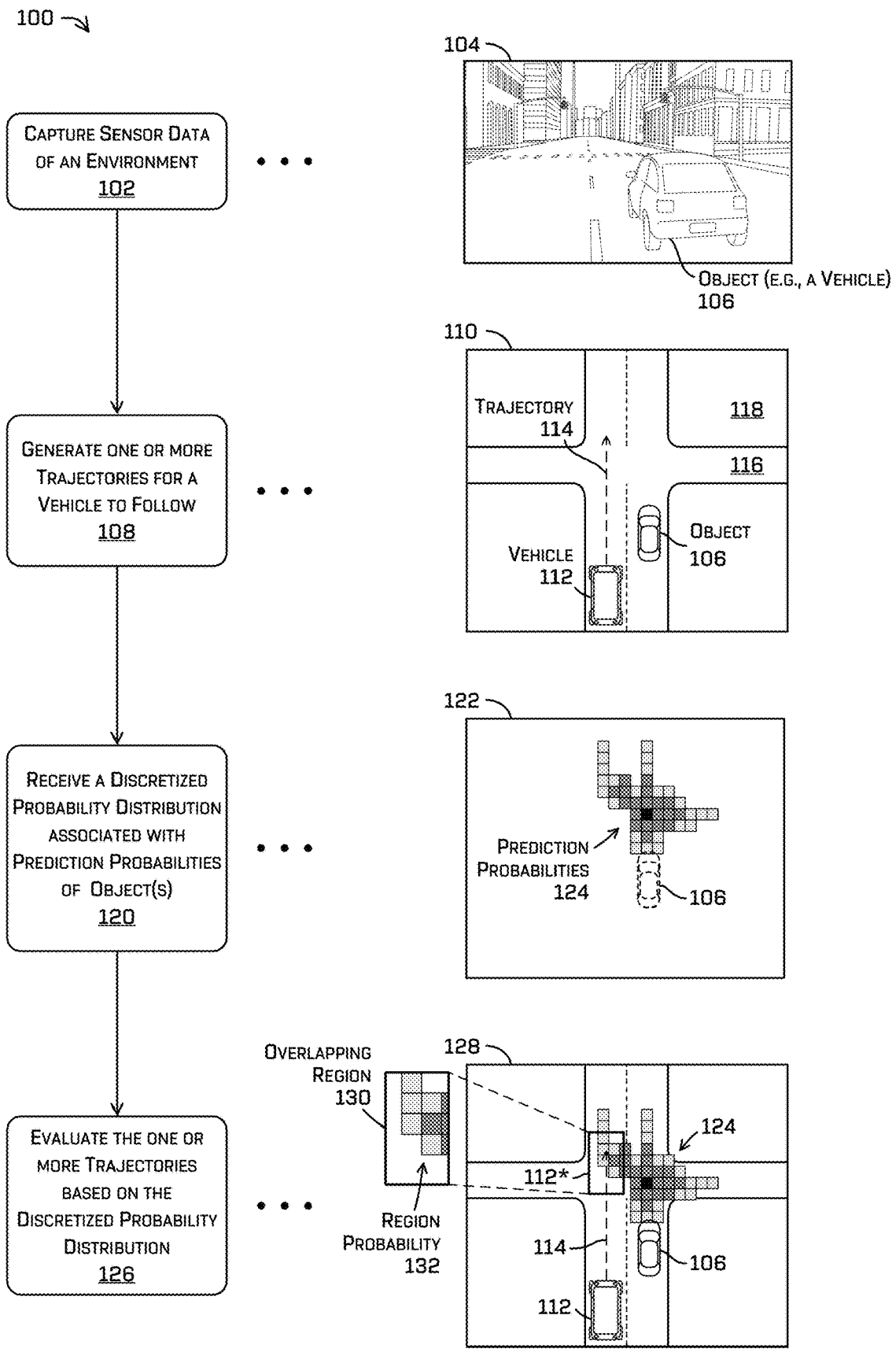
FIG. 1 is a pictorial flow diagram of an example process for capturing sensor data, generating one or more trajectories for a vehicle, receiving discretized probability distributions associated with prediction probabilities, and evaluating the one or more trajectories based at least in part on the prediction probabilities, in accordance with embodiments of the disclosure.

This disclosure is directed to evaluating trajectories based on assessing risk associated with the trajectories with respect to predicted locations of objects in an environment. For example, sensors of a vehicle (such as an autonomous vehicle) can capture sensor data of an environment, which may include objects separate from the vehicle, such as other vehicles or pedestrians. A planning system associated with the vehicle can generate trajectories for the vehicle to follow in the environment to navigate around such objects. A prediction system associated with the vehicle can generate one or more discretized probability distributions or heat maps including prediction probabilities associated with possible locations of the objects in the environment. A discretized probability distribution can be generated to represent any point or period of time in the future, such as 1 second, 2 seconds, 5 seconds, etc. in the future. Further, such a discretized probability distribution can represent prediction probabilities associated with a single object or can represent aggregated prediction probabilities associated with a plurality of objects. The planning system can determine an overlap between a region associated with the vehicle along the trajectory (e.g., at a future time) and a portion of a discretized probability distribution corresponding to the respective future time. Prediction probabilities associated with the overlap can be summed or otherwise aggregated to determine a region probability associated with the overlap, where a region probability is related to (e.g., proportional) to a collision risk for the vehicle. Region probabilities can be determined for a plurality of future times along the trajectory and the region probabilities can be summed or aggregated to determine a trajectory probability. The techniques can be performed in parallel to determine trajectory probabilities for a plurality of trajectories, whereby the plurality of trajectories can be evaluated based on the relative or absolute trajectory probabilities. A trajectory can be selected and the vehicle can be controlled to follow the trajectory to traverse the environment.

Sensor data captured by the vehicle can include lidar data, radar data, image data, time of flight data, sonar data, and the like. In some cases, the sensor data can be provided to a perception system configured to determine a type of an object (e.g., vehicle, pedestrian, bicycle, animal, parked car, tree, building, and the like) in the environment. Further, the perception system can determine, based on the sensor data, movement information about the object in the environment. The sensor data and any data based on the sensor data can be represented in a top-down view (e.g., a top-down image) of the environment. For example, the image can represent the object as a two-dimensional bounding box representing the location of the object in the environment as well as an extent of the object (e.g., the length and width of the object), and/or a classification of the object (e.g., vehicle, pedestrian, and the like). Movement information such as velocity information can be represented as a velocity vector associated with the bounding box, although other representations are contemplated. Additionally, the image can represent, but is not limited to, one or more of: road network information (e.g., semantic labels indicating lanes, crosswalks, stop lines, lane dividers, stop signs, intersections, traffic lights, and the like), traffic light status (e.g., red light, yellow light, green light, etc.), a bounding box associated with the object, a velocity of the object in an x-direction and a y-direction, an acceleration of the object in an x-direction and a y-direction, a blinker status of the object (e.g., left-turn, right-turn, braking, reverse, hazards, no lights, etc.), and the like.

The sensor data captured by the vehicle representing objects in the environment can be used to generate a discretized probability distribution representing possible locations of the object in the environment over time. For example, a prediction system can determine a covariance matrix associated with an uncertainty of an object at an initial state or time. The covariance matrix can include a variance with respect to a longitudinal and/or lateral position in the environment. A location of the object can be evaluated over time to determine possible locations of the object based on the object classification, position, speed, acceleration, sensor uncertainty, and the like. As the object location is evaluated over time (e.g., in the future), the covariance matrix can be evaluated as well to determine a covariance matrix associated with position(s) of the object in the future.

In some instances, the possible locations of the object in the future based on covariance matrices can be represented as Gaussian distributions that can be discretized into a cells or portions of the environment proximate to the object or proximate to the vehicle. For example, a discretized probability distribution can represent a 64×64 grid (or J×K sized grid) representing a 100 meter by 100 meter region around the vehicle. Of course, the discretized probability map can represent any size of region and can represent any number of discrete portions of the region. That is, the discretized probability map can represent an environment at any level of resolution. In some cases, a portion of the discretized probability map can be referred to as a cell of the discretized probability map. Each cell can comprise a prediction probability representing a probability that the object will be at the corresponding location in the environment at the time corresponding to the discretized probability map. In some instances, the machine learning model can output a plurality of discretized probability maps, wherein a discretized probability map of the plurality of discretized probability maps can represent prediction probabilities associated with the object at a particular time in the future (e.g., 0.5 second, 1 second, 3 seconds, 5 seconds, 10 seconds, etc.).

As can be understood, in some examples, discretized probability distributions in the "far" future (e.g., 5 second, 10 seconds, or the like) can be associated with larger position ranges relative to discretized probability distributions in the "near" future (e.g., 1 second, 2 seconds, and the like), as an uncertainty associated with a discretized probability distribution can grow over time. In some examples, an uncertainty of an object can stabilize based on a state of an environment, such as an object approaching a stop sign or a stop light in an environment.

Further, the image data representing the object can be input to a machine learning model trained to output one or more heat maps comprising prediction probabilities associated with possible locations of the object over time. In some examples, such prediction probabilities can be represented as a Gaussian distribution (or any other probabilistic distribution) representing a probability that an object may be located at a location in the future. In some cases, the Gaussian distribution can be a one-dimensional distribution along a lane reference (e.g., a center of a road segment) or a two-dimensional Gaussian distribution in space. In some examples, the prediction probabilities can be represented as a heat map.

A heat map can represent a discretized region of the environment proximate to the vehicle. For example, the heat map can represent a 64×64 grid (or J×K sized grid) representing a 100 meter by 100 meter region around the vehicle. Of course, the heat map can represent any size of region and can represent any number of discrete portions of the region. That is, the heat map can represent an environment at any level of resolution. In some cases, a portion of the heat map can be referred to as a cell of the heat map. Each cell can comprise a prediction probability representing a probability that the object will be at the corresponding location in the environment at the time corresponding to the heat map. In some instances, the machine learning model can output a plurality of heat maps, wherein a heat map of the plurality of heat maps can represent prediction probabilities associated with the object at a particular time in the future (e.g., 0.5 second, 1 second, 3 seconds, 5 seconds, 10 seconds, etc.).

In some examples, individual discretized probability distributions can be generated for individual objects in the environment and aggregated to generate an aggregated discretized probability distributions representing aggregated prediction probabilities of a plurality of objects in an environment. For example, discretized probability distributions for objects can be aligned and individual prediction probabilities can be summed to represent summed or aggregated prediction probabilities. Further, in some cases, a resulting discretized probability distribution can be normalized so that prediction probabilities across the discretized probability distribution collectively add up to 1 (where a probability of 1 represents a certainty that an event will occur). Thus, a single discretized probability distribution can represent prediction probabilities associated with a plurality of objects in the environment.

In some examples, a probability map can generally refer to a discretized prediction probability map or a heat map, as discussed herein. In some examples, a probability map can also be referred to as a discretized probability distribution.

A planning system of the vehicle can generate a plurality of trajectories for the vehicle to follow in the environment. In some cases, for a single trajectory, the operations can include determining a region associated with the vehicle along the trajectory at a future time (e.g., 0.5 second, 1 second, 2 seconds, etc. in the future) based on a velocity, acceleration, etc. of the vehicle. The operations can include determining an overlap between the region associated with the vehicle and a portion of a discretized probability distribution corresponding to the particular future time. In some examples, a region probability can be determined by summing, integrating, or otherwise aggregating the individual probabilities of the discretized probability distribution corresponding to the region of the vehicle (also referred to as an overlapping region or an overlap). If a region probability associated with the overlapping region is above a probability threshold, the trajectory can be rejected, since the region probability can represent relatively high risk that the vehicle will collide with an object in the environment.

Region probabilities can be determined for a plurality of positions along an individual trajectory, which may represent various times in the future. For example, region probabilities can be determined every 0.5 seconds along a trajectory, up to 8 seconds in the future. In some examples, region probabilities can be determined every 0.1 seconds along a trajectory, up to 10 seconds in the future. Of course, any number of region probabilities can be determined for any frequency and/or time horizon. After determining a plurality of region probabilities, the operations can include summing or otherwise aggregating the region probabilities to determine a trajectory probability of the trajectory. In some cases, the trajectory probability can represent a cumulative risk associated with the trajectory.

In some cases, the operations can be performed in parallel to determine region probabilities and trajectory probabilities for multiple trajectories generated by the planning system of the vehicle substantially simultaneously. Further, individual trajectory probabilities of the multiple trajectories can be compared to evaluate the trajectories. In some cases, a trajectory having the lowest probability can represent a lowest risk associated with a trajectory (where a probability corresponds to a likelihood that an object and the vehicle will occupy a same location at a same time). In some cases, a trajectory can be selected based at least in part on the trajectory probability, and the vehicle can be controlled to follow the trajectory to traverse the environment.

The techniques discussed herein can improve a functioning of a computing device in a number of additional ways. In some cases, representing predictions associated with a plurality of objects in a single discretized probability distribution or heat map can represent a simplified representation of the environment for the purposes of evaluating risk associated with a trajectory. In some cases, determining an overlap between a region associated with a vehicle and a portion of a discretized probability distribution or heat map can provide robust techniques for adaptively changing safety margins or varying safety thresholds. In some cases, considering predicted locations of objects in an environment may allow the vehicle (such as an autonomous vehicle) to generate more accurate and/or safer trajectories for the vehicle to traverse the environment. For example, if evaluating a trajectory for the vehicle indicate that such a trajectory would involve a relatively high risk (e.g., suggesting a likelihood of a collision or a near-collision), the vehicle may alter a trajectory (e.g., change lanes, stop, etc.) in order to safely traverse the environment. Further, evaluating region probabilities individually to determine if a region probability is above a threshold may allow a planning system to discard unsafe trajectories, thereby reducing processing and memory usage. Accordingly, techniques for evaluating risk can be performed faster than conventional techniques, which may allow for a faster response or may allow a computing system to consider additional alternative trajectories, thereby improving safety outcomes, performance, and/or accuracy. For example, evaluating discretized probability distributions or heat maps over time can represent significantly fewer calculations to determine risk associated with trajectories compared to techniques based on individual probabilities associated with objects in an environment. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In another example, the techniques can be utilized in an aviation or nautical context, or in any system involving objects or entity that may be associated with behavior that is unknown to the system. Further, although discussed in the context of lidar data, sensor data can include any two-dimensional, three-dimensional, or multi-dimensional data such as image data (e.g., stereo cameras, time-of-flight data, and the like), radar data, sonar data, and the like. Additionally, the techniques described herein can be used with real data (e.g., captured using sensor(s)), simulated data (e.g., generated by a simulator), or any combination of the two.

FIG. 1 is a pictorial flow diagram of an example process 100 for capturing sensor data, generating one or more trajectories for a vehicle, receiving discretized probability distributions associated with prediction probabilities, and evaluating the one or more trajectories based at least in part on the prediction probabilities, in accordance with embodiments of the disclosure.

At operation 102, the process can include capturing sensor data of an environment. In some examples, the sensor data can be captured by one or more sensors on a vehicle (autonomous or otherwise). For example, the sensor data can include data captured by one or more of a lidar sensor, a radar sensor, an image sensor, a time-of-flight sensor, a sonar sensor, and the like.

An example illustrates image data 104 captured in the operation 102. For example, the image data 104 can represent an object 106 in the environment. In some examples, the object 106 can represent a vehicle, a pedestrian, an animal, and the like.

At operation 108, the process can include generating one or more trajectories for a vehicle to follow. An example 110 illustrates a vehicle 112 associated with a trajectory 114, whereby the trajectory 114 represents a path for the vehicle 112 to follow in the environment. In some examples, the trajectory 114 can represent a centerline of a road segment. In some examples, the trajectory 114 can represent controls associated with the vehicle 112. For examples, the controls can include, but are not limited to, steering angles and/or accelerations over time. Of course, the trajectory 114 can represent other data, depending on various implementations.

For the purpose of discussion, the vehicle 112 capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 112 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 112 are described throughout this disclosure.

The object 106 is also located in the environment. In some examples, the object 106 can represent a vehicle, a pedestrian, a bicycle, an animal, and the like. The environment illustrated in the example 104 can include a drivable region 116 and a non-drivable region 118. In some examples, the drivable region 116 can include any area of an environment where the vehicle 112 can (legally) traverse (e.g., a road, a driveway, a parking lot, etc.). In some examples, the non-drivable region 118 can represent areas of an environment where the vehicle 112 cannot legally or physically traverse (e.g., a sidewalk, a building, a park, etc.).

In some examples, the operation 108 can include localizing the vehicle 112 in the environment and accessing map data associated with the environment. For example, map data can comprise map elements such as lane element indicating a region of the environment corresponding to the drivable region 116. Additional examples of map elements can include, but are not limited to, one or more of a crosswalk element, a bike lane element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like.

In some instances, the sensor data captured in the operation 102 can be used to determine information about the object 106, including but not limited to, a type of the object (e.g., semantic information indicating a classification of the object, such as a vehicle, pedestrian, bicycle, animal, and the like). In some instances, the operations can include determining the type of the object 106, a bounding box associated with the object 106, and/or movement information associated with the object, as discussed herein.

At operation 120, the process can include receiving (and/or determining) a discretized probability distribution associated with prediction probabilities of object(s). In some instances, the discretized probability distribution (e.g., a probability map, a discretized prediction probability map, a heat map, and the like) can represent (e.g., from a top-down perspective of the environment) prediction probabilities indicative of a probability that the object 106 will be at a corresponding location in the environment at the time corresponding to a respective discretized probability distribution. That is, a discretized probability distribution can represent the prediction probabilities of object(s) being at particular locations in the environment at a particular time in the future. In some examples, and as discussed herein, the discretized probability distribution(s) can represent Gaussian probabilities associated with possible locations of object(s) in an environment.

In some instances, operation 120 can include generating or determining discretized probability distributions (or, specifically, heat map(s)) representing prediction probabilities of possible locations of the object 106 in the environment. In some instances, and as discussed herein, the operation 120 can include receiving or generating a discretized probability distribution associated with a plurality of objects, such that the discretized probability distribution represents aggregated prediction probabilities associated with a probability that an object (of a plurality of objects) will occupy a cell or portion of the discretized probability map distribution at a particular time. In some instances, the operation 120 can include receiving a plurality of discretized probability distributions corresponding to future times. For example, a first discretized probability distribution can represent an environment at time $T_1$, a second discretized probability distribution can represent the environment at time $T_2$ (after $T_1$), and an N-th discretized probability distribution can represent the environment at time $T_N$ (after $T_2$).

An example 122 illustrates a plurality of prediction probabilities 124 associated with the object 106. For the purposes of illustration, a color (or degree of darkness) of a cell can represent a probability associated with the cell that the object 106 may be location in that cell at a time associated with the discretized probability distribution. For example, a white color may illustrate a low probability, a light gray color may illustrate a low probability, a dark gray color may illustrate a medium probability, and a black color may illustrate a high probability. Of course, the example 122 is illustrative and each cell can be associated with an individual probability value. In some instances, the prediction probabilities 124 associated with the example 122 (which may also be referred to as a discretized probability distribution 122 or a heat map 122) may collectively add up to a probability of 1.

Examples of generating one or more discretized probability distributions are discussed throughout this disclosure. Further, examples of generating one or more heat maps are discussed in U.S. patent application Ser. No. 16/151,607, filed Oct. 4, 2018. Application Ser. No. 16/151,607 is herein incorporated by reference, in its entirety.

At operation 126, the process can include evaluating the one or more trajectories based on the discretized probability distribution. An example 128 illustrates evaluating the trajectory 114 with respect to the prediction probabilities 124 of the example 122. For example, a region of the vehicle 112 at a time in the future along the trajectory 114 can be represented as a region 112*. In some examples, a size of the region 112* can be based at least in part on a size of the vehicle 112, a velocity of the vehicle 112, a location in the environment, a type of objects in an environment, a safety factor associated with the vehicle 112, and the like.

In some examples, the operation 126 can include determining an overlapping region 130 between the region 112* and the prediction probabilities 124. In some examples, the operation 126 can include summing, integrating, or otherwise aggregating individual probabilities associated with the prediction probabilities 124 within the overlapping region 130 to determine a region probability 132. In some examples, the region probability 132 can be related to (e.g., proportional to) a risk associated with a collision or a near-collision when the vehicle 112 is predicted to be at a location (represented as the region 112*) in the future.

As discussed throughout the disclosure, the operation 126 can include determining a region probability for various times along the trajectory 114 and summing or aggregating the region probabilities to determine a trajectory probability, which may represent an overall risk associated with a trajectory. In some examples, trajectory probabilities can be compared to select a trajectory, which can be used to control the vehicle to traverse an environment (e.g., selecting the trajectory having the lowest total probability).

Additional details of discretized probability distributions, heat maps, region probabilities, and trajectory probabilities throughout this disclosure.

Figure 2:
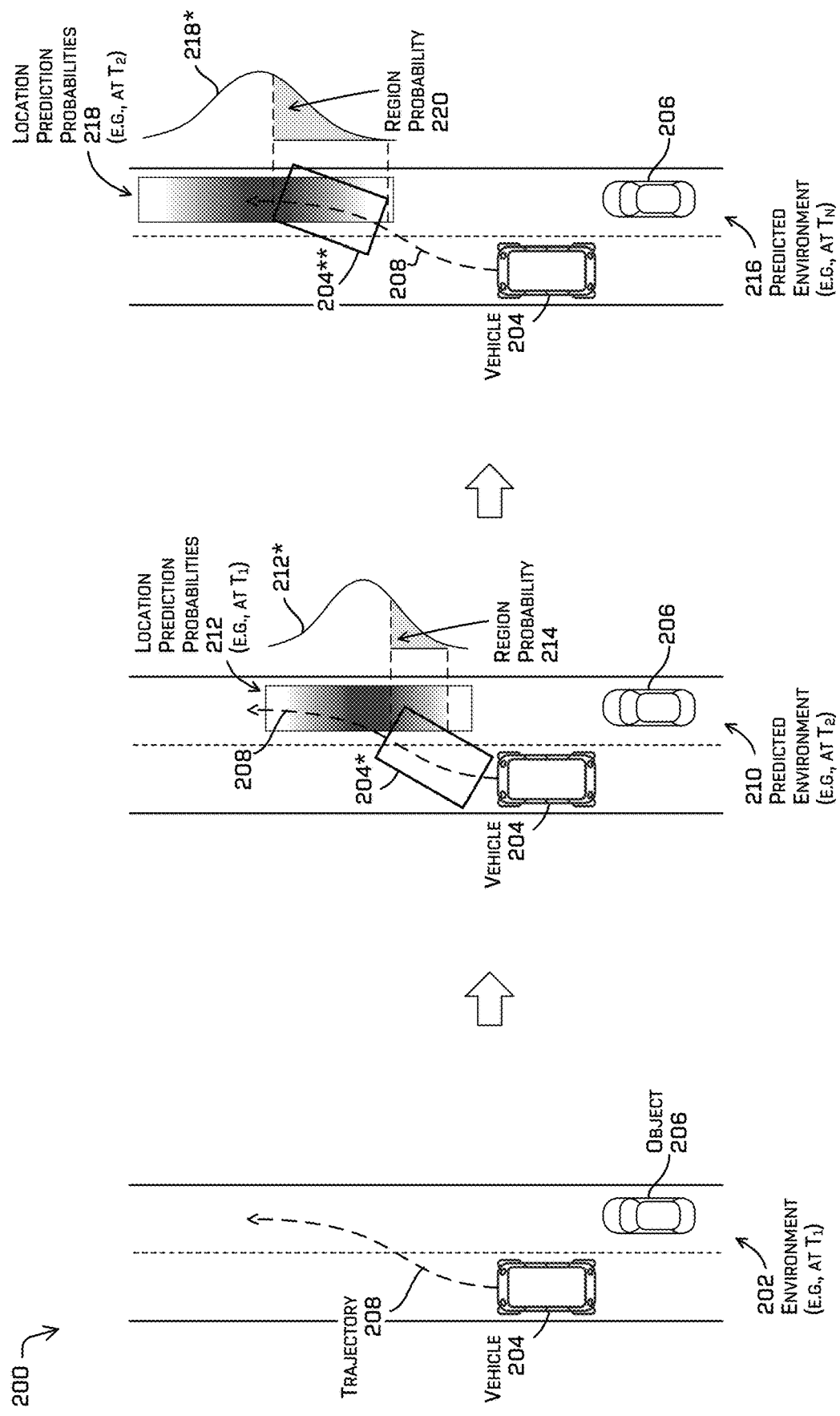
FIG. 2 is an example of evaluating a trajectory of a vehicle with respect to prediction probabilities associated with an object over time, in accordance with embodiments of the disclosure.

FIG. 2 is an example 200 of evaluating a trajectory of a vehicle with respect to prediction probabilities associated with an object over time, in accordance with embodiments of the disclosure.

An environment 202 includes a vehicle 204 and an object 206. In some examples, a planning system of the vehicle 204 may be evaluating a trajectory 208 with respect to predicted locations of the object 206 over time. As illustrated, the environment 202 may represent an initial time (e.g., $T_1$).

In some examples, a planning system of the vehicle 204 may determine a risk associated with the vehicle 204 following the trajectory 208 by predicting an overlap between location(s) of the vehicle 204 in the future with respect to location prediction probabilities associated with the object 206.

A predicted environment 210 illustrates the vehicle 204 and the object 206 at a future time (e.g., at $T_2$, a time after $T_1$). For example, location prediction probabilities 212 represent a Gaussian distribution of probabilities associated with possible locations of the object 206 in the predicted environment 210 at $T_2$. In some instances, the location prediction probabilities 212 can represent a one-dimensional Gaussian distribution (e.g., along a centerline of a road), a two-dimensional Gaussian distribution (e.g., representing an area of a drivable surface), and the like. A distribution 212* corresponds to the location prediction probabilities 212. In some instances, the location prediction probabilities 212 correspond to a top-down view of the probabilities in the predicted environment 210, while the distribution 212* represents a side profile of such a distribution, for the purposes of discussion. In some examples, the location prediction probabilities 212 can be based at least in part on a shape of the object 206. For example, a compact car may be associated with location prediction probabilities that are smaller relative to location prediction probabilities associated with a bus.

A region 204* corresponds to a predicted location of the vehicle 204 at time $T_2$ in the predicted environment 210 along the trajectory 208. In some cases, to determine a risk associated with the trajectory 208, a planning system of the vehicle 204 can determine an overlap between the location prediction probabilities 212 and the region 204*. Such an overlap can represent an area under the curve of the distribution 212*, which is represented as a region probability 214. In some cases, the region probability 214 can be proportional to or can correspond to a risk associated with the trajectory 208 with respect to the object 206 in the predicted environment 210.

Further, a predicted environment 216 illustrates the vehicle 204 and the object 206 at a future time (e.g., at $T_N$, a time after $T_2$). For example, location prediction probabilities 218 represent a Gaussian distribution of probabilities associated with possible locations of the object 206 in the predicted environment 216 at $T_N$. In some instances, the location prediction probabilities 218 can represent a one-dimensional Gaussian distribution (e.g., along a centerline of a road), a two-dimensional Gaussian distribution (e.g., representing an area of a drivable surface), and the like. In some examples, the distributions can be discretized over the environment, as discussed herein. A distribution 218* corresponds to the location prediction probabilities 218. In some instances, the location prediction probabilities 218 correspond to a top-down view of the probabilities in the predicted environment 216, while the distribution 218* represents a side profile of such a distribution, for the purposes of discussion.

A region 204 corresponds to a predicted location of the vehicle 204 at time $T_N$ in the predicted environment 216 along the trajectory 208. In some cases, to determine a risk associated with the trajectory 208, a planning system of the vehicle 204 can determine an overlap between the location prediction probabilities 218 and the region 204. Such an overlap can represent an area under the curve of the distribution 218*, which is represented as a region probability 220. In some cases, the region probability 220 can be proportional to or can correspond to a risk associated with the trajectory 208 with respect to the object 206 in the predicted environment 216.

Figure 3:
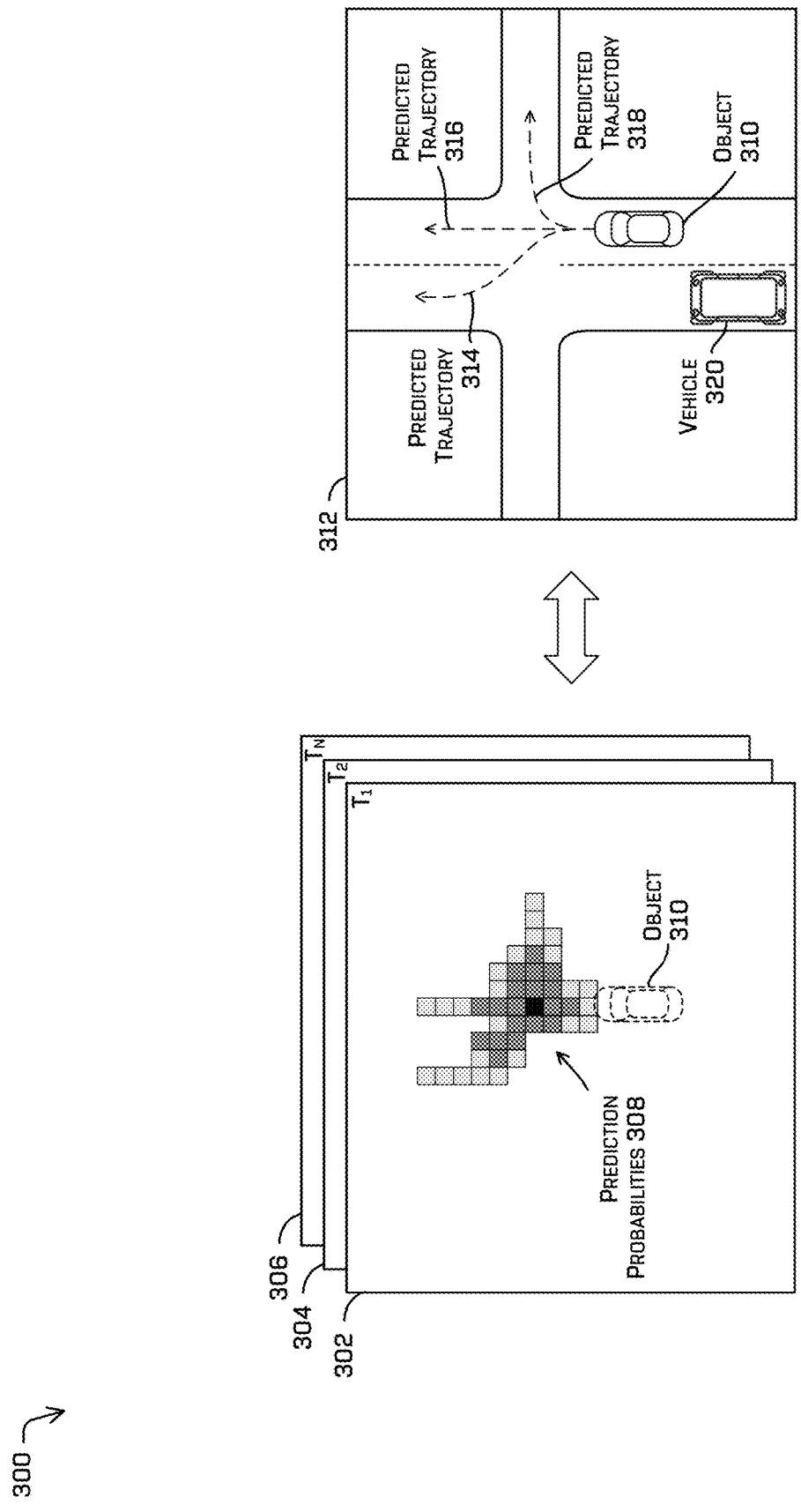
FIG. 3 is an example of a discretized probability distributions representing predicted trajectories associated with an object in an environment, in accordance with embodiments of the disclosure.

FIG. 3 is an example 300 of discretized probability distributions (e.g., probability maps, discretized prediction probability maps, heat maps, and the like) representing predicted trajectories associated with an object in an environment, in accordance with embodiments of the disclosure.

While FIG. 2 illustrates distributions (e.g., Gaussian distributions) representing prediction probabilities, FIG. 3 represents prediction probabilities as discretized probability distributions 302, 304, and 306. In some cases, the discretized probability distribution 302 can represent prediction probabilities 308 associated with an object 310 in an environment. In some cases, the discretized probability distribution 302 substantially corresponds to the discretized probability distribution illustrated in the example 122.

In some examples, the discretized probability distribution 302 can represent the prediction probabilities 308 associated with the object 310 at a first time, the discretized probability distribution 304 can represent prediction probabilities associated with the object 310 at a second time after the first time, and the discretized probability distribution 306 can represent prediction probabilities associated with the object 310 at a third time (or N-th time) after the second time.

FIG. 3 further illustrates an example environment 312 including predicted trajectories 314, 316, and 318. In some examples, the predicted trajectories 314, 316, and 318 can be based at least in part on the prediction probabilities 308. For example, the predicted trajectories 314, 316, and 318 can be generated by determining a highest probability cell of the discretized probability distributions 302, 304, and 306 and fitting a curve to the points to determine a candidate trajectory. Further, a candidate trajectory can be evaluated to ensure that such a trajectory corresponds to a physical trajectory that the object 310 is capable of traversing (e.g., based on velocity and/or positional restrictions). Accordingly, after a first candidate trajectory has been determined (which may correspond to the predicted trajectory 314), operations may include masking portions of the discretized probability distributions 302, 304, and 306 corresponding to the predicted trajectory 314 and again determining the highest remaining probability cells to generate a second candidate trajectory. The operations can be repeated to generate additional candidate trajectories, as appropriate. Examples of generating one or more predicted trajectories are discussed in U.S. patent application Ser. No. 16/151,607, filed Oct. 4, 2018. Application Ser. No. 16/151,607 is herein incorporated by reference, in its entirety.

As discussed herein, the discretized probability distributions 302, 304, and 306, and the predicted trajectories 314, 316, and 318 can be generated by a prediction system and/or a planning system of a vehicle 320 (e.g., without determining the predicted trajectories 314, 316, and 316).

Figure 4:
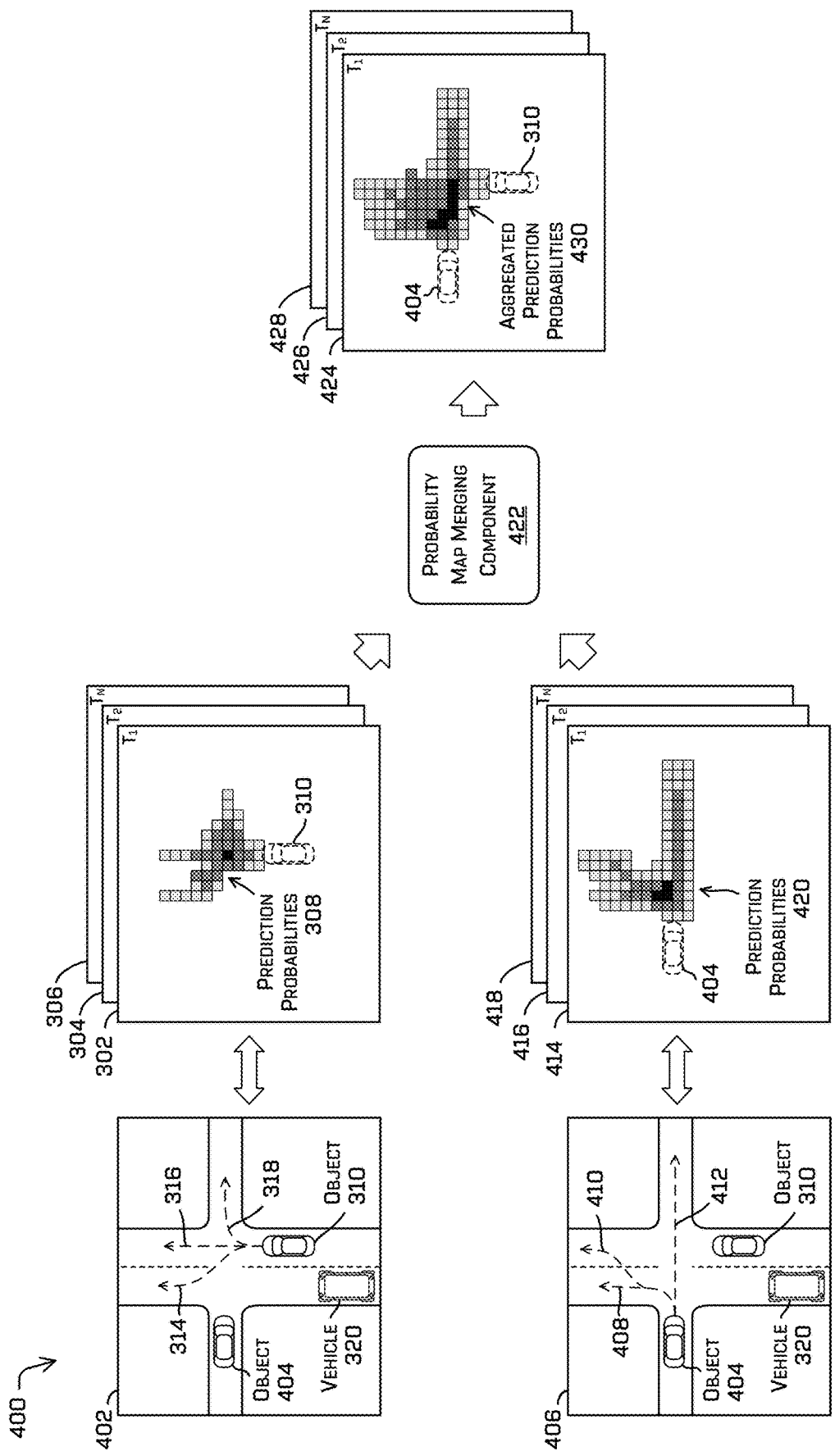
FIG. 4 is a pictorial flow diagram of an example process for generating individual discretized probability distributions associated with individual objects in an environment and merging the discretized probability distributions into an aggregated discretized probability distribution representing aggregated prediction probabilities of multiple objects in an environment, in accordance with embodiments of the disclosure.

FIG. 4 is a pictorial flow diagram 400 of an example process for generating individual discretized probability distributions associated with individual objects in an environment and merging the discretized probability distributions into an aggregated discretized probability distribution representing aggregated prediction probabilities of multiple objects in an environment, in accordance with embodiments of the disclosure.

An environment 402 may include the vehicle 320, an object 310, and an object 404. The environment 402 may illustrate the predicted trajectories 314, 316, and 318 associated with the object 310, while predicted trajectories associated with the object 404 can be represented in an environment 406.

For example, the environment 406 can illustrate the object 404 associated with predicted trajectories 408, 410, and 412. As discussed above with respect to FIG. 3, the predicted trajectories 408, 410, and 412 can be represented by discretized probability distributions 414, 416, and 418, whereby the discretized probability distribution 414 represents prediction probabilities 420 associated with the object at a first time $T_1$. In some instances, the discretized probability distributions 414 and 302 can represent objects 404 and 310, respectively, at a same first time, $T_1$. Further, the discretized probability distributions 416 and 304 can represent the objects 404 and 310, respectively, at a same second time, $T_2$, after the first time. Further, the discretized probability distributions 418 and 306 can represent the objects 404 and 310, respectively, at a same N-th time, $T_N$, after the second time.

The pictorial flow diagram 400 further illustrates the discretized probability distributions 302, 304, 306, 414, 416, and 418 being merged by a probability map merging component 422 to generate merged maps 424, 426, and 428, respectively. As illustrated, the merged map 424 comprises aggregated prediction probabilities 430, which correspond to predicted locations of the objects 310 and 404.

In some examples, the probability map merging component 422 can include functionality to align corresponding discretized probability distributions, probability maps, or heat maps (e.g., corresponding to a same time) and to sum or otherwise aggregate probabilities associated with individual cells to generate aggregated prediction probabilities. Further, the probability map merging component 422 can normalize a resulting aggregated prediction probability such that probabilities associated with a merged map collectively add up to a probability of 1.

Figure 5:
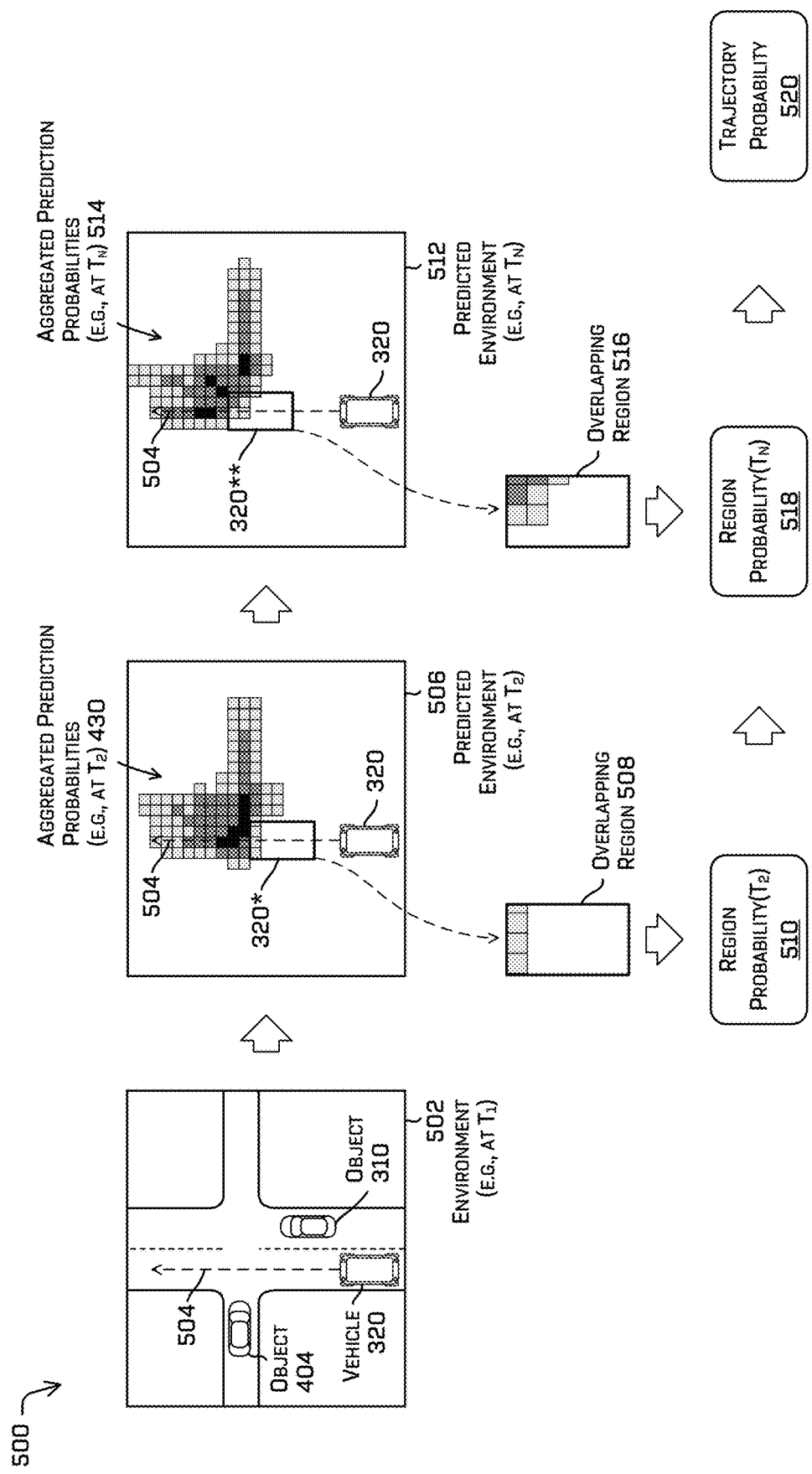
FIG. 5 is a pictorial flow diagram of an example process for determining an overlap between regions associated with a vehicle along a trajectory and corresponding discretized probability distributions to determine region probabilities and a trajectory probability correspond to risk associated with the trajectory, in accordance with embodiments of the disclosure.

FIG. 5 is a pictorial flow diagram 500 of an example process for determining overlapping regions between regions associated with a vehicle along a trajectory and corresponding probability maps to determine region probabilities and a trajectory probability correspond to risk associated with the trajectory, in accordance with embodiments of the disclosure.

An environment 502 may include the vehicle 320, the object 310, and the object 404. The environment 502 may illustrate a trajectory 504 associated with the vehicle 320 for the vehicle 320 to traverse through the environment 502. In some instances, the environment 502 may represent an initial time $T_1$ A predicted environment 506 may represent a time in the future ($T_2$) after the initial time. In some examples, the predicted environment 506 may be represented by the aggregated prediction probabilities 430 and a region 320* associated with a position of the vehicle 320 along the trajectory 504. In some examples, the planning system of the vehicle 320 can determine an overlapping region 508 representing an overlap between the region 320* and the aggregated prediction probabilities 430. Further, the planning system of a vehicle 320 can determine a region probability 510 associated with the overlapping region 508. In some instances, the region probability 510 associated with the time $T_2$ can represent a summing, integration, or aggregation of the portion of the aggregated prediction probabilities 430 associated with the overlapping region 508.

The predicted environment 506 can be evolved forwards in time to be represented as a predicted environment 512 (e.g., representing the environment 502 at an N-th time, $T_N$).

In some examples, the predicted environment 512 may be represented by aggregated prediction probabilities 514 and a region 320 associated with a position of the vehicle 320 along the trajectory 504 at time $T_N$. In some examples, the planning system of the vehicle 320 can determine an overlapping region 516 representing an overlap between the region 320 and the aggregated prediction probabilities 514. Further, the planning system of a vehicle 320 can determine a region probability 518 associated with the overlapping region 516. In some instances, the region probability 518 associated with the N-th time $T_N$ can represent a summing, accumulation, integration, or aggregation of the portion of the aggregation prediction probabilities 514 associated with the overlapping region 516.

In some examples, if an individual region probability 510 or 518 is above a threshold the trajectory 504 can be rejected as representing too high of a risk associated with a collision or a near-collision.

In some examples, the region probabilities 510, 518, etc. can be summed or otherwise aggregated to determine a trajectory probability 520 associated with the trajectory 504. In some examples, the trajectory probability 520 is associated with or is proportional to a risk associated with trajectory colliding or nearly colliding with one or more of the objects 310 or 404.

Figure 6:
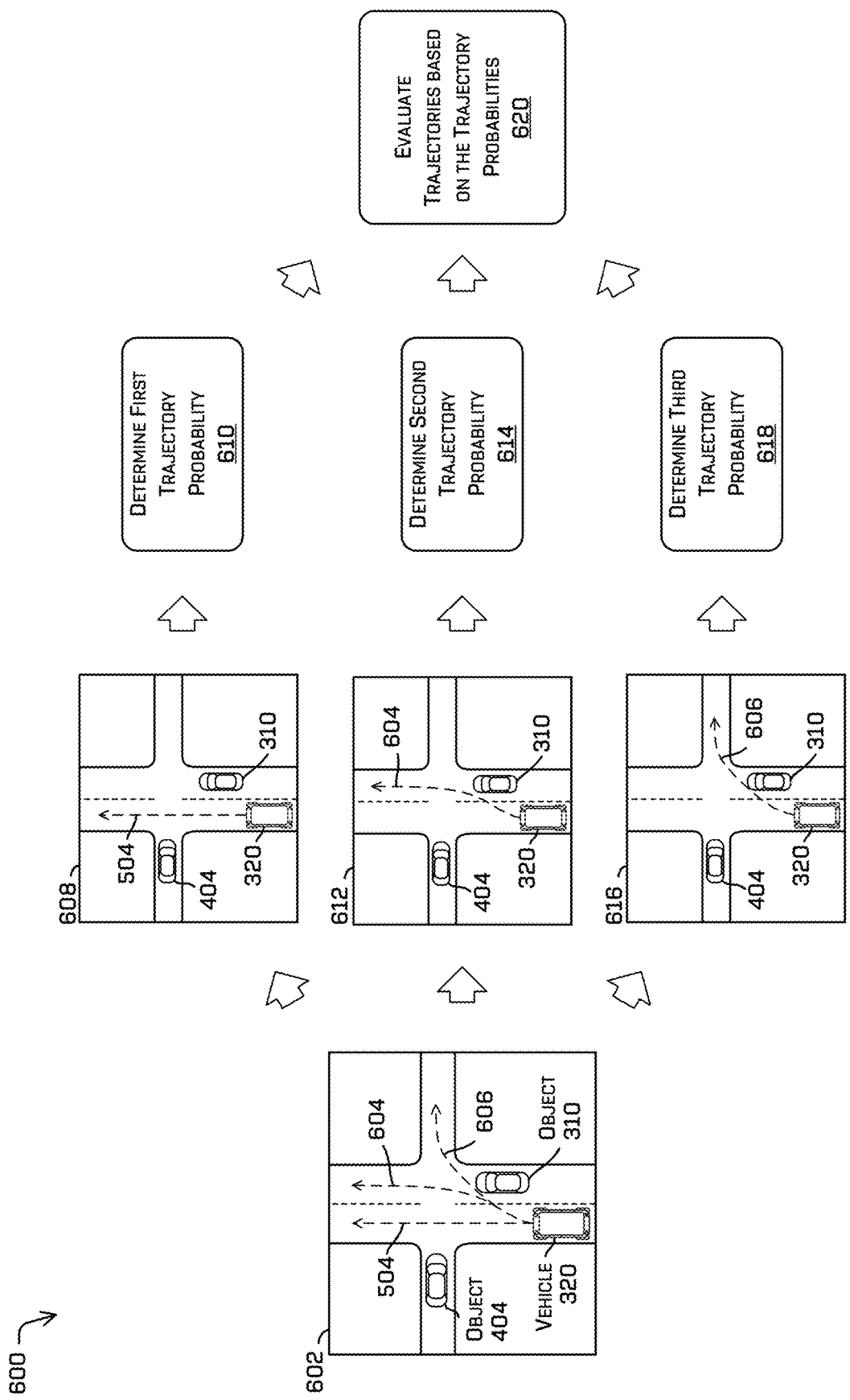
FIG. 6 is a pictorial flow diagram of an example process for evaluating a plurality of trajectories with respect to discretized probability distributions to evaluate the plurality of trajectories based on trajectory probabilities, in accordance with embodiments of the disclosure.

FIG. 6 is a pictorial flow diagram 600 of an example process for evaluating a plurality of trajectories with respect to prediction maps to evaluate the plurality of trajectories based on trajectory probabilities, in accordance with embodiments of the disclosure.

An environment 602 may include the vehicle 320, the object 310, and the object 404, as discussed herein. Further, the vehicle 320 may be associated with a plurality of trajectories 504, 604, and 606.

In some examples, a planning system of the vehicle 320 can generate the trajectories 504, 604, and 606 to correspond to various actions that the vehicle 320 can take in the environment 602. For example, actions can be based at least in part on map data indicating potential drivable surfaces in the environment 602. By way of example, the trajectory 504 may represent a "stay in lane" action, the trajectory 604 may represent a "lane change right" action, and the trajectory 606 may represent a "lane change right" action followed by a "right turn" action. Of course, any number of actions are contemplated herein.

The planning system of the vehicle 320 can determine region probabilities and trajectories individually for the various trajectories 504, 604, and 606 and can subsequently evaluate the trajectories 504, 604, and 606 based at least in part on the trajectory probabilities. For example, an environment 608 illustrates the vehicle 320 following the trajectory 504 with respect to the objects 310 and 404. As discussed above in connection with FIG. 5, the operations can include determining a first trajectory probability 610. In some examples, the environment 608 can correspond to the environment 502 illustrated in FIG. 5 and the first trajectory probability determined in the operation 610 can correspond to the trajectory probability trajectory 520 determined in FIG. 5.

An environment 612 illustrates the vehicle 320 following the trajectory 604 with respect to the objects 310 and 404. As discussed above in connection with FIG. 5, the operations of determining a second trajectory probability 614 can include determining individual region probabilities and aggregating such region probabilities to generate the second trajectory probability.

Further, an environment 616 illustrates the vehicle 320 following the trajectory 606 with respect to the objects 310 and 404. As discussed above in connection with FIG. 5, the operations of determining a third trajectory probability 618 can include determining individual region probabilities and aggregating such region probabilities to generate the third trajectory probability.

After determining the first trajectory probability associated with the trajectory 504 (e.g., in the operation 610), the second region probability associated with the trajectory 604 (e.g., in the operation 614), and the third trajectory probability associated with the trajectory 606 (e.g., in the operation 618), the operation 620 can include evaluating the trajectories based at least in part on the trajectory probabilities. For example, the operation 620 can include selecting a trajectory with a lowest trajectory probability, which may correspond to a trajectory representing a lowest risk for the vehicle 320 to traverse through the environment 602. In some instances, the trajectory probabilities are one of many costs to consider when selecting a trajectory to control the vehicle 320, such as ride comfort, trip time, distances to objects, steering costs, velocity/acceleration costs, and the like.

In some examples, the operation 620 can include controlling the vehicle 320 to follow a selected trajectory.

Figure 7:
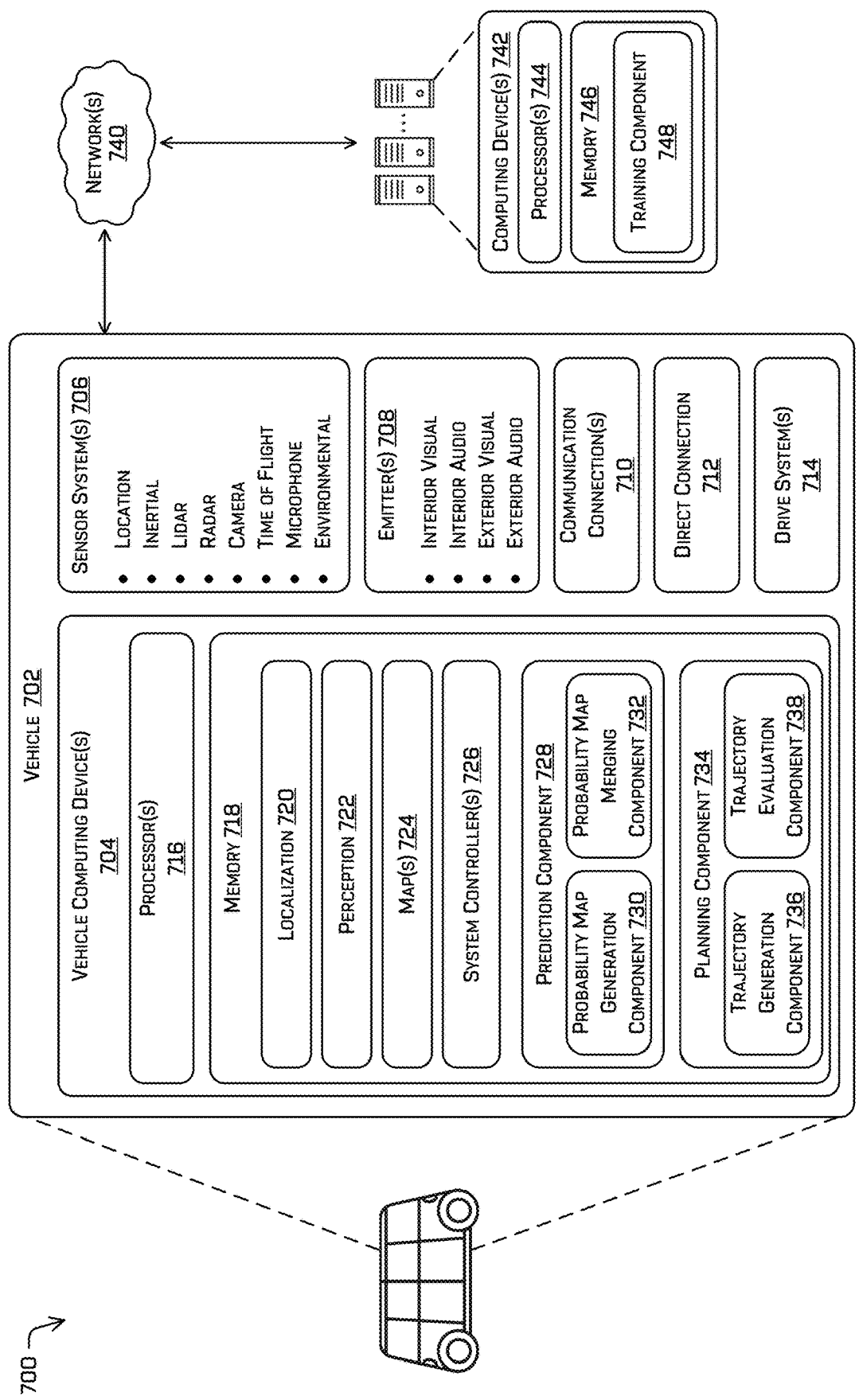
FIG. 7 depicts a block diagram of an example system for implementing the techniques described herein.

FIG. 7 depicts a block diagram of an example system 700 for implementing the techniques described herein. In at least one example, the system 700 can include a vehicle 702.

The vehicle 702 can include a vehicle computing device 704, one or more sensor systems 706, one or more emitters 708, one or more communication connections 710, at least one direct connection 712, and one or more drive systems 714.

The vehicle computing device 704 can include one or more processors 716 and memory 718 communicatively coupled with the one or more processors 716. In the illustrated example, the vehicle 702 is an autonomous vehicle; however, the vehicle 702 could be any other type of vehicle. In the illustrated example, the memory 718 of the vehicle computing device 704 stores a localization component 720, a perception component 722, one or more maps 724, one or more system controllers 726, a prediction component 728 comprising a probability map generation component 730 and a probability map merging component 732, and a planning component 734 comprising a trajectory generation component 736 and a trajectory evaluation component 738. Though depicted in FIG. 7 as residing in memory 718 for illustrative purposes, it is contemplated that the localization component 720, the perception component 722, the one or more maps 724, the one or more system controllers 726, the prediction component 728, the probability map generation component 730, the probability map merging component 732, the planning component 734, the trajectory generation component 736, and the trajectory evaluation component 738 may additionally, or alternatively, be accessible to the vehicle 702 (e.g., stored remotely).

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for generating map data, as discussed herein.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 718 can further include the one or more maps 724 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 724 can include at least one map (e.g., images and/or a mesh). In some examples, the vehicle 702 can be controlled based at least in part on the one or more maps 724. That is, the one or more maps 724 can be used in connection with the localization component 720, the perception component 722, the prediction component 728, and/or the planning component 734 to determine a location of the vehicle 702, identify objects in an environment, and/or generate routes and/or trajectories to navigate within an environment.

In some examples, the one or more maps 724 can be stored on a remote computing device(s) (such as the computing device(s) 742) accessible via network(s) 740. In some examples, multiple maps 724 can be stored based on, for example, a characteristic (e.g., type of entity, time of day, day of week, season of the year, etc.). Storing multiple maps 724 can have similar memory requirements, but increase the speed at which data in a map can be accessed.

In at least one example, the vehicle computing device 704 can include one or more system controllers 726, which can be configured to control steering, propulsion, braking, safety, emitters, communication, and other systems of the vehicle 702. These system controller(s) 726 can communicate with and/or control corresponding systems of the drive system(s) 714 and/or other components of the vehicle 702.

In general, the prediction component 728 can generate one or more probability maps representing prediction probabilities of possible locations of one or more objects in an environment. For example, the prediction component 728 can generate one or more probability maps for vehicles, pedestrians, animals, and the like within a threshold distance from the vehicle 702. In some instances, the prediction component 728 can measure a trace of an object and generate a discretized prediction probability map, a heat map, a probability distribution, a discretized probability distribution, and/or a trajectory for the object based on observed and predicted behavior.

In some examples, the probability map generation component 730 can include functionality to generate a discretized probability distribution, a probability map, a discretized prediction probability map, or a heat map representing prediction probabilities of possible locations for individual objects in an environment. For example, the probability map generation component 730 can generate a top-down view of the environment including objects in the environment (e.g., represented by a bounding box, as discussed herein), semantic information about the object (e.g., a classification type), movement information (e.g., velocity information, acceleration information, etc.), and the like. The probability map generation component 730 can further generate image elements (e.g., symbols) in the image representing the various attributes of the object(s) and the environment, including but not limited to: one or more velocity vectors, one or more acceleration vectors, lighting indicators (e.g., braking lights of the object, turn signal lights of the object, etc., represented as respective indicator status), traffic light information (e.g., status of a traffic light), lane information (e.g., whether the lane is a left turn only lane, right turn only lane, etc.), and the like.

In some examples, the probability map generation component 730 can generate one or more images comprising semantic information of the environment. In some examples, the probability map generation component 730 can generate one or more images representing observed motion of an object in the environment. Such top-down images or views of the environment can represent prior information about the state of the environment and objects in the environment that can be used to generate at least one heat map, as discussed herein.

The sensor data captured by the vehicle representing objects in the environment can be used by the probability map generation component 730 to generate a discretized probability distribution representing possible locations of the object in the environment over time. For example, the probability map generation component 730 can determine a covariance matrix associated with an uncertainty of an object at an initial state or time. The covariance matrix can include a variance with respect to a longitudinal and/or lateral position in the environment. A location of the object can be evaluated over time to determine possible locations of the object based on the object classification, position, speed, acceleration, sensor uncertainty, and the like. As the object location is evaluated over time (e.g., in the future), the covariance matrix can be evaluated as well to determine a covariance matrix associated with position(s) of the object in the future.

In some instances, the possible locations of the object in the future based on covariance matrices can be represented as Gaussian distributions that can be discretized into a cells or portions of the environment proximate to the object or proximate to the vehicle. For example, a discretized probability distribution can represent a 64×64 grid (or J×K sized grid) representing a 100 meter by 100 meter region around the vehicle. Of course, the discretized probability map can represent any size of region and can represent any number of discrete portions of the region. That is, the discretized probability map can represent an environment at any level of resolution. In some cases, a portion of the discretized probability map can be referred to as a cell of the discretized probability map. Each cell can comprise a prediction probability representing a probability that the object will be at the corresponding location in the environment at the time corresponding to the discretized probability map. In some instances, the machine learning model can output a plurality of discretized probability maps, wherein a discretized probability map of the plurality of discretized probability maps can represent prediction probabilities associated with the object at a particular time in the future (e.g., 0.5 second, 1 second, 3 seconds, 5 seconds, 10 seconds, etc.).

As can be understood, in some examples, discretized probability distributions in the "far" future (e.g., 5 second, 10 seconds, or the like) can be associated with larger position ranges relative to discretized probability distributions in the "near" future (e.g., 1 second, 2 seconds, and the like), as an uncertainty associated with a discretized probability distribution can grow over time. In some examples, an uncertainty of an object can stabilize based on a state of an environment, such as an object approaching a stop sign or a stop light in an environment.

In some examples, the probability map generation component 730 can input such image(s) to one or more machine learning models trained to output one or more heat maps based on top-down images input into the model. In some examples, the probability generation component 730 can include a convolutional neural network (CNN), which may or may not include one or more recurrent neural network (RNN) layers, e.g., long short-term memory (LSTM) layers.

In some examples, a heat map output by the probability map generation component 730 can represent a discretized region of the environment proximate to the autonomous vehicle. For example, the heat map can represent a 64×64 grid (or J×K sized grid) representing a 100 meter by 100 meter region around the autonomous vehicle. Of course, the heat map can represent any size of region and can represent any number of discrete portions of the region. In some cases, a portion of the heat map can be referred to as a cell of the heat map. Each cell can comprise a prediction probability representing a probability that the object will be at the corresponding location in the environment at the time corresponding to the heat map. In some instances, the machine learning model can output a plurality of heat maps, wherein a heat map of the plurality of heat maps can represent probability predictions associated with the object at a particular time in the future (e.g., 0.5 second, 1 second, 3 seconds, 5 seconds, 10 seconds, etc.).

In some examples, the probability map generation component 730 can be trained to generate any number of heat maps based on any number of input images. For example, the probability map generation component 730 can receive N number of input images and can output M number of heat maps.

In some examples, the probability map merging component 732 can include functionality to receive one or more probability maps associated with individual objects and can merge the probability maps to generate a merged probability map comprising aggregated prediction probabilities of objects in an environment.

For example, the probability map merging component 732 can include functionality to align individual probability maps such that a first cell of a first probability map corresponds to a same location as a first cell of a second probability map. Further, the probability map merging component 732 can merge two or more probability maps corresponding to a same predicted time. Merging can include summing or otherwise aggregating probabilities associated with corresponding cells to determine a merged probability.

The probability map merging component 732 can further include functionality to normalize a merged probability map such that probabilities associated with individual cells collectively add up to a probability of 1 (or nearly a probability of 1, depending on an error in the system).

In some cases, the probability map merging component 732 can correspond to the probability map merging component 422 of FIG. 4.

In general, the planning component 734 can determine a path for the vehicle 702 to follow to traverse through an environment. For example, the planning component 734 can determine various routes and trajectories and various levels of detail. For example, the planning component 734 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 734 can generate an instruction for guiding the autonomous vehicle along at least a portion of the route from the first location to the second location. In at least one example, the planning component 734 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In some examples, the trajectory generation component 736 can include functionality to generate one or more trajectories for the vehicle 702 to follow to traverse through an environment. As discussed herein, in some examples, the trajectory generation component 736 can generate various trajectories corresponding to various actions for the vehicle to perform in an environment. In some examples, the trajectory generation component 736 can generate trajectories based at least in part on a centerline of a road segment. In some examples, the trajectory generation component 736 can generate a trajectory based at least in part on various costs, including but not limited to a reference cost (e.g., a cost associated with generating a trajectory at a distance away from a reference trajectory), an obstacle cost (e.g., a cost associated with a distance from a trajectory to an obstacle in the environment), a steering cost (e.g., associated with maximum steering angles), an acceleration cost (e.g., a cost associated with maximum acceleration and/or braking), and the like. Of course, the trajectory generation component 736 can generate a trajectory based on a variety of factors and is not limited to express examples discussed herein.

In some examples, the trajectory evaluation component 738 can include functionality to receive one or more probability maps (e.g., discretized prediction probability maps, heat maps, discretized probability distributions, and the like) from the prediction component 728. In some examples, the trajectory evaluation component 738 can receive the entire probability map generated by the probability map merging component 732, and in some instances, the trajectory evaluation component 738 can send an indication of region(s) associated with the vehicle 702 at points along one or more trajectories to limit or reduce an amount of probability map data to be provided by the prediction component 728 to the planning component 734.

As discussed throughout this disclosure, the trajectory evaluation component 738 can determine an overlap between a region associated with the vehicle 702 along a trajectory and a corresponding heat map. The trajectory evaluation component 738 can determine a region probability by summing, integrating, or otherwise aggregating the individual prediction probabilities associated with cells of the probability map within each corresponding overlapping region. Region probabilities for a trajectory can be summed or otherwise aggregated to determine a trajectory probability, which can correspond to or can be proportional to a risk associated with a particular trajectory.

When the planning component 734 is evaluating a plurality of trajectories, the trajectory evaluation component 738 can determine a trajectory probability for each trajectory and select a trajectory to follow (or can determine to generate a new trajectory) based at least in part on the trajectory probabilities.

In some instances, aspects of some or all of the components discussed herein can include any models, algorithms, and/or machine learning algorithms. For example, in some instances, the components in the memory 718 (and the memory 746, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naive Bayes, Gaussian naive Bayes, multinomial naive Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 706 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 706 can include multiple instances of each of these or other types of sensors. For instance, the lidar sensors can include individual lidar sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device 704. Additionally or alternatively, the sensor system(s) 706 can send sensor data, via the one or more networks 740, to the one or more computing device(s) 742 at a particular frequency, after a lapse of a predetermined period of time, in near real-time, etc.

The vehicle 702 can also include one or more emitters 708 for emitting light and/or sound, as described above. The emitters 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device 704 to another computing device or a network, such as network(s) 740. For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In some examples, the vehicle 702 can send sensor data to one or more computing device(s) 742 via the network(s) 740. In some examples, the vehicle 702 can send raw sensor data to the computing device(s) 742. In other examples, the vehicle 702 can send processed sensor data and/or representations of sensor data to the computing device(s) 742. In some examples, the vehicle 702 can send sensor data to the computing device(s) 742 at a particular frequency, after a lapse of a predetermined period of time, in near real-time, etc. In some cases, the vehicle 702 can send sensor data (raw or processed) to the computing device(s) 742 as one or more log files.

The computing device(s) 742 can include processor(s) 744 and a memory 746 storing a training component 748.

In some instances, the training component 748 can include functionality to train a machine learning model to output one or more heat maps including prediction probabilities. In some examples, the training component 748 can include functionality to train a machine learning model to output a Gaussian probability associated with location(s) of an object based on a classification of the object, location, map data, pose of the object, and the like. For example, the training component 748 can receive a set of images representing a top-down view of an environment. In some cases, the set of images can represent an object traversing through an environment for a period of time, such as 5 seconds, 7 seconds, 10 seconds, 20 seconds, and the like. At least a portion of the set of images can be used as an input to train the machine learning model, and at least a portion of the set of images can be used as ground truth information for training the machine learning model. As a non-limiting example, a first set (e.g., 3, 4, 5, or more) of a sequence of images may be input into the machine learned model. A second set of images (or trajectory information associated therefrom—e.g., by extracting positions and/or velocities from the images) in the sequence of images immediately preceding the first set may then be used as ground truth for training the model. Thus, by providing images of recorded trajectories where objects traverse an environment, the prediction component 728 can be trained by the training component 748 to output predicted points, confidence values associated with the predicted points, or one or more heat maps including prediction probabilities, as discussed herein.

The processor(s) 716 of the vehicle 702 and the processor(s) 744 of the computing device(s) 742 can be any suitable processor capable of executing instructions to process data and perform operations as described herein. By way of example and not limitation, the processor(s) 716 and 744 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 746 are examples of non-transitory computer-readable media. The memory 718 and 746 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information.

The architectures, systems, and individual elements described herein can include many other logical, programmatic, and physical components, of which those shown in the accompanying figures are merely examples that are related to the discussion herein.

In some instances, the memory 718 and 746 can include at least a working memory and a storage memory. For example, the working memory may be a high-speed memory of limited capacity (e.g., cache memory) that is used for storing data to be operated on by the processor(s) 716 and 744. In some instances, the memory 718 and 746 can include a storage memory that may be a lower-speed memory of relatively large capacity that is used for long-term storage of data. In some cases, the processor(s) 716 and 744 cannot operate directly on data that is stored in the storage memory, and data may need to be loaded into a working memory for performing operations based on the data, as discussed herein.

It should be noted that while FIG. 7 is illustrated as a distributed system, in alternative examples, components of the vehicle 702 can be associated with the computing device(s) 742 and/or components of the computing device(s) 742 can be associated with the vehicle 702. That is, the vehicle 702 can perform one or more of the functions associated with the computing device(s) 742, and vice versa.

FIGS. 1, 2, 4-6, and 8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 8:
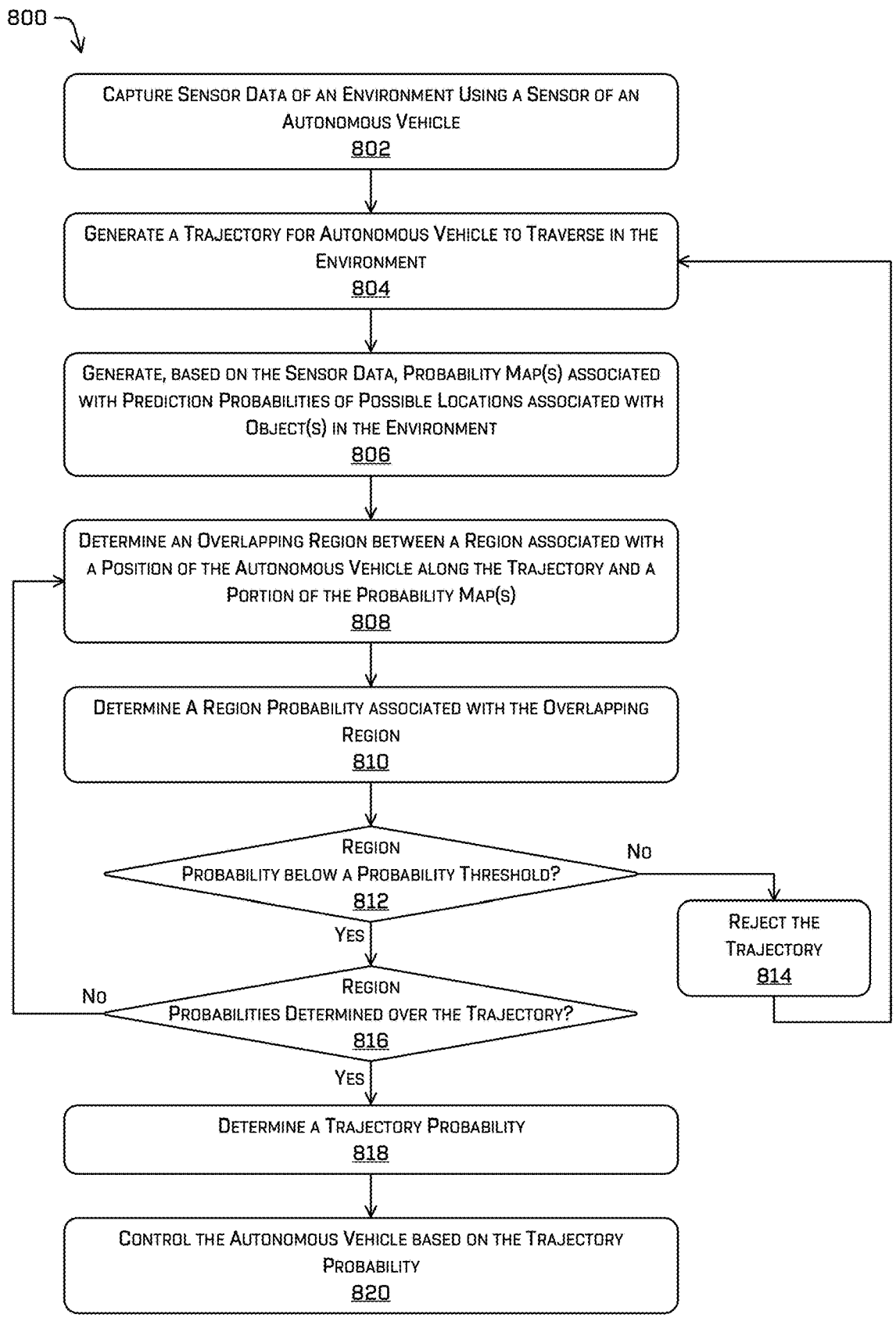
FIG. 8 depicts an example process for capturing sensor data, generating one or more trajectories for an autonomous vehicle, generating probability maps associated with prediction probabilities, determining a trajectory probability, and controlling the autonomous vehicle based on the trajectory probability, in accordance with embodiments of the disclosure.

FIG. 8 depicts an example process 800 for capturing sensor data, generating one or more trajectories for an autonomous vehicle, generating heat maps associated with prediction probabilities, determining a trajectory probability, and controlling the autonomous vehicle based on the trajectory probability, in accordance with embodiments of the disclosure. For example, some or all of the process 800 can be performed by one or more components in FIG. 7, as described herein. For example, some or all of the process 800 can be performed by the vehicle computing device(s) 704 and/or the computing device(s) 742.

At operation 802, the process can include capturing sensor data of an environment using a sensor of an autonomous vehicle. For example, the sensor data can include data captured by one or more of a lidar sensor, a radar sensor, an image sensor, a time of flight sensor, a sonar sensor, and the like. In some examples, the operation 802 can include capturing sensor data using a plurality of sensors and fusing or combining the sensor data into a detail and informative representation of the environment.

At operation 804, the process can include generating a trajectory for an autonomous vehicle to traverse in the environment. In some examples, the operation 804 can include generating a plurality of trajectories for the autonomous vehicle to follow. For examples, each trajectory can represent an individual action for the vehicle to follow based on drivable surfaces in an environment. Examples of actions include, but are not limited to, one or more of a stay in lane action, a merge left action, a merge right action, a change lane action, a right turn action, a turn left action, a stop action, and the like. In some examples, the operation 804 can include generating an exhaustive set of trajectories based on all possible (e.g., legal and physically) movements in an environment.

At operation 806, the process can include generating, based on the sensor data, one or more probability maps associated with prediction probabilities of possible locations associated with one or more objects in the environment. For example, the operation 806 can include generating an aggregated probability map at time intervals in the future. For example, the probability maps can include a probability map representing the environment every 0.5 seconds for the next 8 seconds, although any frequency and time horizon can be used.

At operation 808, the process can include determining an overlapping region between a region associated with a position of the autonomous vehicle along the trajectory and a portion of the one or more probability maps. Examples of determining an overlapping region are discussed above in connection with FIGS. 1 and 5, as well as throughout this disclosure.

At operation 810, the process can include determining a region probability associated with the overlapping region. In some examples, the operation 810 can include determining summing, integrating, or otherwise aggregating the prediction probabilities associated with the overlapping region to determine the region probability. In some cases, individual region probabilities can be associated with discrete future times.

At operation 812, the process can include determining whether the region probability is below a probability threshold. If not (e.g., "no" in the operation 812), the trajectory can be rejected in operation 814, as the region probability may represent an unacceptable risk associated with the trajectory.

After the operation 814, the process can return to the operation 804 to generate a new trajectory and/or evaluate another trajectory previously generated.

Returning to the operation 812, if the region probability is below the probability threshold (e.g., "yes" in the operation 812), the process can move to operation 816.

At operation 816, the process can include determining whether (all) region probabilities have been determined over the trajectory. For example, the operation 816 can include determining whether region probabilities have been determined for each probability map representing a future time. If the region probabilities have not yet been determined over the trajectory (indicating there are more region probabilities to determine), the process returns to the operation 808 to determine additional region probabilities. If all region probabilities have been determined (e.g., "yes" in the operation 816), the process continues to operation 818.

At operation 818, the process can include determining a trajectory probability. In some cases, the operation 818 can include summing or aggregating individual region probabilities associated with a trajectory to determine the trajectory probability.

At operation 820, the process can include controlling the autonomous vehicle based at least in part on the trajectory probability. In some examples, the operation 820 can include comparing trajectory probabilities between multiple proposed trajectories to determine a trajectory representing a lowest risk for the autonomous vehicle to traverse in an environment. In some examples, a trajectory probability can be one of many factors or costs associated with selecting a trajectory to control the autonomous vehicle. In some examples, the operation 820 can include controlling one or more of steering, braking, and/or acceleration of the autonomous vehicle to traverse through the environment.

EXAMPLE CLAUSES

A: A system comprising: one or more processors; and one or more computer-readable media storing instructions executable by the one or more processors, wherein the instructions, when executed, cause the system to perform operations comprising: capturing sensor data of an environment using a sensor of an autonomous vehicle; generating a trajectory for the autonomous vehicle to traverse in the environment; generating, based at least in part on the sensor data, a heat map, a portion of the heat map comprising a location and a probability that an object in the environment is associated with the location; determining a region associated with a position of the autonomous vehicle along the trajectory; determining, based at least in part on the trajectory and the heat map, a region probability associated with the region, the region probability being indicative of a probability that the autonomous vehicle and the object will occupy the region at a same time; determining that the region probability is below a probability threshold; and controlling the autonomous vehicle to follow the trajectory based at least in part on the region probability being below the probability threshold.

B: The system of paragraph A, wherein: the heat map represents probabilities of the object at a time, the probabilities comprising the probability; and the region associated with the position of the autonomous vehicle represents a predicted region associated with the autonomous vehicle at the time.

C: The system of paragraph A or B, wherein: the heat map represents a plurality of discretized regions of the environment; the portion of the heat map is a discretized region of the plurality of discretized regions; and determining the region probability comprises: summing individual probabilities associated with a subset of the plurality of discretized regions, wherein the subset of the plurality of discretized regions corresponds to the region.

D: The system of any of paragraphs A-C, wherein: the trajectory is a first trajectory of a plurality of trajectories for the autonomous vehicle to traverse in the environment; the region probability is a first region probability; and the operations further comprise: determining a second region probability based at least in part on a second trajectory for the autonomous vehicle to traverse in the environment and the heat map; determining a first trajectory probability based on the first region probability and a second trajectory probability based on the second region probability; and controlling the autonomous vehicle to follow the first trajectory based at least in part on the first trajectory probability being less than the second trajectory probability.

E: The system of any of paragraphs A-D, wherein: the object is a first object in the environment; the heat map is an aggregated heat map based at least in part on a first heat map and second heat map; the first heat map represents first prediction probabilities of first possible locations associated with the first object in the environment; the second heat map represents second prediction probabilities of second possible locations associated with a second object in the environment; and the aggregated heat map represents aggregated predication probabilities based at least in part on summing a first portion of the first prediction probabilities and a second portion of the second prediction probabilities.

F: The system of any of paragraphs A-E, wherein a size of the region associated with the position of the autonomous vehicle is based at least in part on a length of the autonomous vehicle, a width of the autonomous vehicle, and a predicted velocity of the autonomous vehicle.

G: A method comprising: receiving a trajectory for a vehicle to traverse in an environment; receiving a discretized probability distribution associated with prediction probabilities of possible locations of an object in the environment; determining a region associated with a position of the vehicle along the trajectory; determining a region probability associated with the region based on the discretized probability distribution; evaluating the trajectory based at least in part on the region probability; and controlling the vehicle based at least in part on evaluating the trajectory.

H: The method of paragraph G, further comprising: determining that the region probability meets or exceeds a probability threshold, wherein evaluating the trajectory based at least in part on the region probability comprises rejecting the trajectory.

I: The method of paragraph G or H, further comprising: determining that the region probability is below a first probability threshold, wherein controlling the vehicle based at least in part on evaluating the trajectory comprises controlling the vehicle to follow the trajectory based at least in part on the region probability being below the first probability threshold or based at least in part on an aggregated trajectory probability based on the region probability being below a second probability threshold.

J: The method of any of paragraphs G-I, wherein: the discretized probability distribution is a first heat map associated with first possible locations of the object in the environment at a first time; the region is a first region associated with a first position of the vehicle along the trajectory; the region probability is a first region probability associated with the first region; and the method further comprises: receiving a second heat map associated with second possible locations of the object, the second possible locations associated with a second time after the first time; determining a second region associated with a second position of the vehicle along the trajectory; and determining a second region probability associated with the second region based at least in part on the second heat map, wherein evaluating the trajectory further based at least in part on the second region probability.

K: The method of any of paragraphs G-J, wherein: the trajectory is a first trajectory of a plurality of trajectories for the vehicle to traverse in the environment; the region probability is a first region probability; and the method further comprises: determining a second region probability based at least in part on a second trajectory for the vehicle to traverse in the environment and the discretized probability distribution; determining a first trajectory probability based at least in part on the first region probability and a second trajectory probability based at least in part on the second region probability; and controlling the vehicle to follow the first trajectory or the second trajectory based at least in part on the first trajectory probability and the second trajectory probability.

L: The method of any of paragraphs G-K, wherein the discretized probability distribution is a heat map comprising discretized portions of the environment, a discretized portion comprising a prediction probability, a location, and a size.

M: The method of any of paragraphs G-L, wherein: the discretized probability distribution represents prediction probabilities associated with a first predicted trajectory of the object in the environment and a second predicted trajectory of the object in the environment.

N: The method of any of paragraphs G-M, wherein: the object is a first object in the environment; the discretized probability distribution is based at least in part on a first discretized probability distribution and second discretized probability distribution; the first discretized probability distribution represents first prediction probabilities associated with first possible locations of the first object in the environment; the second discretized probability distribution represents second prediction probabilities associated with second possible locations of a second object in the environment; and the discretized probability distribution represents aggregated predication probabilities based at least in part on accumulating a first portion of the first prediction probabilities and a second portion of the second prediction probabilities.

O: The method of any of paragraphs G-N, wherein: the discretized probability distribution is a heat map is received from a machine learning model trained to generate the heat map representing the object; or the discretized probability distribution is a probability map based on Gaussian probabilities based at least in part on a classification of the object, an initial position of the object, and a velocity of the object.

P: The method of any of paragraphs G-O, wherein: the vehicle is an autonomous vehicle; the trajectory is a first trajectory associated with a first action; and the method further comprises: determining a first cumulative probability associated with the first trajectory; receiving a second trajectory associated with a second action; determining a second cumulative probability associated with the second trajectory; determining that the first cumulative probability less than the second cumulative probability; and controlling the autonomous vehicle to follow the first trajectory based at least in part on the first cumulative probability and the second cumulative probability.

Q: A non-transitory computer-readable medium storing instructions that, when executed, cause one or more processors to perform operations comprising: receiving a trajectory for a vehicle to traverse in an environment; receiving a discretized probability distribution comprising prediction probabilities associated with possible locations of an object in the environment; determining a region associated with a position of the vehicle along the trajectory; determining a region probability associated with the region based at least in part on the discretized probability distribution; evaluating the trajectory based at least in part on the region probability; and controlling the vehicle based at least in part on evaluating the trajectory.

R: The non-transitory computer-readable medium of paragraph Q, wherein: the discretized probability distribution comprises a heat map and represents first prediction probabilities associated with a first predicted trajectory of the object in the environment and second prediction probabilities associated with a second predicted trajectory of the object in the environment.

S: The non-transitory computer-readable medium of paragraph Q or R, wherein: the object is a first object in the environment; the discretized probability distribution is based at least in part on a first discretized probability distribution and second discretized probability distribution; the first discretized probability distribution represents first prediction probabilities associated with first possible locations of the first object in the environment; the second discretized probability distribution represents second prediction probabilities associated with second possible locations of a second object in the environment; and the discretized probability distribution represents aggregated predication probabilities based at least in part on accumulating a first portion of the first prediction probabilities and a second portion of the second prediction probabilities.

T: The non-transitory computer-readable medium of any of paragraphs Q-S, wherein: the vehicle is an autonomous vehicle; the trajectory is a first trajectory associated with a first action; and the operations further comprise: determining a first cumulative probability associated with the first trajectory; receiving a second trajectory associated with a second action; determining a second cumulative probability associated with the second trajectory; determining that the first cumulative probability less than the second cumulative probability; and controlling the autonomous vehicle to follow the first trajectory based at least in part on the first cumulative probability and the second cumulative probability.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the one or more processors to perform operations comprising:
capturing sensor data of an environment using a sensor of an autonomous vehicle;
generating a trajectory for the autonomous vehicle to traverse in the environment;
generating, based at least in part on the sensor data, a heat map, a portion of the heat map comprising a location and a probability that an object in the environment is associated with the location, wherein the location and the probability are based at least in part on a size of the object;
determining a region associated with a position of the autonomous vehicle along the trajectory;
determining, based at least in part on the trajectory and the heat map, a region probability associated with the region, the region probability being indicative of a probability that the autonomous vehicle and the object will occupy the region at a same time;
determining that the region probability is below a probability threshold; and
controlling the autonomous vehicle to follow the trajectory based at least in part on the region probability being below the probability threshold.

2. The system of claim 1, wherein:
the heat map represents probabilities of the object at a time, the probabilities comprising the probability; and
the region associated with the position of the autonomous vehicle represents a predicted region associated with the autonomous vehicle at the time.

3. The system of claim 1, wherein:
the heat map represents a plurality of discretized regions of the environment;
the portion of the heat map is a discretized region of the plurality of discretized regions; and
determining the region probability comprises:
summing individual probabilities associated with a subset of the plurality of discretized regions, wherein the subset of the plurality of discretized regions corresponds to the region.

4. The system of claim 1, wherein:
the trajectory is a first trajectory of a plurality of trajectories for the autonomous vehicle to traverse in the environment;
the region probability is a first region probability; and
the operations further comprise:
determining a second region probability based at least in part on a second trajectory for the autonomous vehicle to traverse in the environment and the heat map;
determining a first trajectory probability based on the first region probability and a second trajectory probability based on the second region probability; and
controlling the autonomous vehicle to follow the first trajectory based at least in part on the first trajectory probability being less than the second trajectory probability.

5. The system of claim 1, wherein:
the object is a first object in the environment;
the heat map is an aggregated heat map based at least in part on a first heat map and second heat map;
the first heat map represents first prediction probabilities of first possible locations associated with the first object in the environment;
the second heat map represents second prediction probabilities of second possible locations associated with a second object in the environment; and
the aggregated heat map represents aggregated prediction probabilities based at least in part on summing a first portion of the first prediction probabilities and a second portion of the second prediction probabilities.

6. The system of claim 1, wherein a size of the region associated with the position of the autonomous vehicle is based at least in part on a length of the autonomous vehicle, a width of the autonomous vehicle, and a predicted velocity of the autonomous vehicle.

7. A method comprising:
receiving a trajectory for a vehicle to traverse in an environment;
receiving a discretized probability distribution associated with prediction probabilities of possible locations of an object in the environment, wherein the prediction probabilities and the possible locations of the object are based at least in part on a size of the object;
determining a region associated with a position of the vehicle along the trajectory;
determining a region probability associated with the region based on the discretized probability distribution;
evaluating the trajectory based at least in part on the region probability; and
controlling the vehicle based at least in part on the evaluating the trajectory.

8. The method of claim 7, further comprising:
determining that the region probability meets or exceeds a probability threshold, wherein
the evaluating the trajectory based at least in part on the region probability comprises rejecting the trajectory.

9. The method of claim 7, further comprising:
determining that the region probability is below a first probability threshold, wherein controlling the vehicle based at least in part on the evaluating the trajectory comprises controlling the vehicle to follow the trajectory based at least in part on the region probability being below the first probability threshold or based at least in part on an aggregated trajectory probability based on the region probability being below a second probability threshold.

10. The method of claim 7, wherein:
the discretized probability distribution is a first heat map associated with first possible locations of the object in the environment at a first time;
the region is a first region associated with a first position of the vehicle along the trajectory;
the region probability is a first region probability associated with the first region; and
the method further comprises:
receiving a second heat map associated with second possible locations of the object, the second possible locations associated with a second time after the first time;
determining a second region associated with a second position of the vehicle along the trajectory; and
determining a second region probability associated with the second region based at least in part on the second heat map, wherein evaluating the trajectory further based at least in part on the second region probability.

11. The method of claim 7, wherein:
the trajectory is a first trajectory of a plurality of trajectories for the vehicle to traverse in the environment;
the region probability is a first region probability; and
the method further comprises:
determining a second region probability based at least in part on a second trajectory for the vehicle to traverse in the environment and the discretized probability distribution;
determining a first trajectory probability based at least in part on the first region probability and a second trajectory probability based at least in part on the second region probability; and
controlling the vehicle to follow the first trajectory or the second trajectory based at least in part on the first trajectory probability and the second trajectory probability.

12. The method of claim 7, wherein the discretized probability distribution is a heat map comprising discretized portions of the environment, a discretized portion comprising a prediction probability, a location, and a size.

13. The method of claim 7, wherein:
the discretized probability distribution represents prediction probabilities associated with a first predicted trajectory of the object in the environment and a second predicted trajectory of the object in the environment.

14. The method of claim 7, wherein:
the object is a first object in the environment;
the discretized probability distribution is based at least in part on a first discretized probability distribution and second discretized probability distribution;
the first discretized probability distribution represents first prediction probabilities associated with first possible locations of the first object in the environment;
the second discretized probability distribution represents second prediction probabilities associated with second possible locations of a second object in the environment; and
the discretized probability distribution represents aggregated prediction probabilities based at least in part on accumulating a first portion of the first prediction probabilities and a second portion of the second prediction probabilities.

15. The method of claim 7, wherein:
the discretized probability distribution is a heat map that is received from a machine learning model trained to generate the heat map representing the object; or
the discretized probability distribution is a probability map based on Gaussian probabilities based at least in part on a classification of the object, an initial position of the object, and a velocity of the object.

16. The method of claim 7, wherein:
the vehicle is an autonomous vehicle;
the trajectory is a first trajectory associated with a first action; and
the method further comprises:
determining a first cumulative probability associated with the first trajectory;
receiving a second trajectory associated with a second action;
determining a second cumulative probability associated with the second trajectory;
determining that the first cumulative probability less than the second cumulative probability; and
controlling the autonomous vehicle to follow the first trajectory based at least in part on the first cumulative probability and the second cumulative probability.

17. A non-transitory computer-readable medium storing instructions that, when executed, cause one or more processors to perform operations comprising:
receiving a trajectory for a vehicle to traverse in an environment;
receiving a discretized probability distribution comprising prediction probabilities associated with possible locations of an object in the environment, wherein the prediction probabilities and the possible locations of the object are based at least in part on a size of the object;

determining a region associated with a position of the vehicle along the trajectory;

determining a region probability associated with the region based at least in part on the discretized probability distribution;

evaluating the trajectory based at least in part on the region probability; and controlling the vehicle based at least in part on the evaluating the trajectory.

18. The non-transitory computer-readable medium of claim 17, wherein:

the discretized probability distribution comprises a heat map and represents first prediction probabilities associated with a first predicted trajectory of the object in the environment and second prediction probabilities associated with a second predicted trajectory of the object in the environment.

19. The non-transitory computer-readable medium of claim 17, wherein:

the object is a first object in the environment;

the discretized probability distribution is based at least in part on a first discretized probability distribution and second discretized probability distribution;

the first discretized probability distribution represents first prediction probabilities associated with first possible locations of the first object in the environment;

the second discretized probability distribution represents second prediction probabilities associated with second possible locations of a second object in the environment; and the discretized probability distribution represents aggregated prediction probabilities based at least in part on accumulating a first portion of the first prediction probabilities and a second portion of the second prediction probabilities.

20. The non-transitory computer-readable medium of claim 17, wherein:

the vehicle is an autonomous vehicle;

the trajectory is a first trajectory associated with a first action; and the operations further comprise:

determining a first cumulative probability associated with the first trajectory;

receiving a second trajectory associated with a second action;

determining a second cumulative probability associated with the second trajectory;

determining that the first cumulative probability less than the second cumulative probability; and controlling the autonomous vehicle to follow the first trajectory based at least in part on the first cumulative probability and the second cumulative probability.

\* \* \* \* \*